(12) United States Patent
Nakanishi et al.

(10) Patent No.: US 7,637,125 B2
(45) Date of Patent: Dec. 29, 2009

(54) GLASS TUBE PROCESSING METHOD, APPARATUS AND GLASS TUBE

(75) Inventors: Tetsuya Nakanishi, Kanagawa (JP);
Masashi Onishi, Kanagawa (JP);
Tomoyuki Yokokawa, Kanagawa (JP);
Masaaki Hirano, Kanagawa (JP);
Nobuyuki Taira, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 828 days.

(21) Appl. No.: 10/992,102

(22) Filed: Nov. 19, 2004

(65) Prior Publication Data
US 2005/0144983 A1 Jul. 7, 2005

(30) Foreign Application Priority Data
Nov. 20, 2003 (JP) ............................. 2003-391477

(51) Int. Cl.
*C03B 37/07* (2006.01)
(52) U.S. Cl. ............................. 65/384; 65/417; 65/419; 65/488; 65/271; 65/276; 65/509
(58) Field of Classification Search .................. 65/379, 65/382, 384, 417, 419, 488, 271, 276, 279, 65/509
See application file for complete search history.

(56) References Cited

U.S. PATENT DOCUMENTS

| | | | |
|---|---|---|---|
| 5,203,691 A * | 4/1993 | OBrien, Jr. | .................. 431/278 |
| 5,318,612 A | 6/1994 | Le Noane et al. | |
| 6,502,427 B1 * | 1/2003 | Yuan | ........................... 65/377 |

| | | | |
|---|---|---|---|
| 2003/0115908 A1 * | 6/2003 | Hammerle et al. | ............ 65/379 |
| 2005/0103057 A1 * | 5/2005 | Kang et al. | .................... 65/391 |

FOREIGN PATENT DOCUMENTS

| | | | |
|---|---|---|---|
| JP | 61-222934 | | 10/1986 |
| JP | 62-162632 | | 7/1987 |
| JP | 3-242342 | | 10/1991 |
| JP | 4-26522 | | 1/1992 |
| JP | 2003-238177 | | 8/2003 |
| JP | 2003221247 A | * | 8/2003 |
| JP | 2003-321238 | | 11/2003 |
| WO | WO 00/34193 | | 6/2000 |

OTHER PUBLICATIONS ed. R.L. Howell & J.M. Morriss *Optical Fiber Communications* International Edition 1991, McGraw-Hill Book Co., p. 66-67.

* cited by examiner

*Primary Examiner*—Steven P Griffin
*Assistant Examiner*—Queenie Dehghan
(74) *Attorney, Agent, or Firm*—McDermott Will & Emery LLP (57) ABSTRACT

In a glass processing method according to the invention, in the case of performing chemical vapor deposition or diameter shrinkage of a substrate glass tube G by relatively moving a heating furnace 20 comprising a heating element 21 for annularly enclosing the circumference of the substrate glass tube in a longitudinal direction of the substrate glass tube G with respect to the substrate glass tube G in which an outer diameter is 30 mm or more and a wall thickness is 3 mm or more and is less than 15 mm and an ovality of the outer diameter is 1.0% or less using a glass processing apparatus 1, a temperature of at least one of the heating element 21 and the substrate glass tube G is measured and the amount of heat generation of the heating element 21 is adjusted based on the measured temperature.

7 Claims, 6 Drawing Sheets

GLASS TUBE PROCESSING METHOD, APPARATUS AND GLASS TUBE

BACKGROUND OF THE INVENTION

The present invention relates to a glass tube processing method and apparatus for performing chemical vapor deposition or diameter shrinkage of a substrate glass tube by relatively moving the substrate glass tube and a heating source in a longitudinal direction of the substrate glass tube, and further a glass tube in which chemical vapor deposition or diameter shrinkage is performed.

In a step of manufacturing an optical fiber preform, an chemical vapor deposition step (see, for example, Non-patent Reference 1) of forming a glass layer inside a glass tube or a step of shrinking a glass tube to a desired diameter is performed. In these steps, a glass tube is sequentially heated in a longitudinal direction of the glass tube by a heating source provided outside the glass tube.

For example, in an chemical vapor deposition step called an chemical vapor deposition CVD method, glass raw material gas for generating glass fine particles ($SiO_2$) is introduced into the inside of a substrate glass tube used as a substrate of chemical vapor deposition and a heating source provided outside the substrate glass tube is transversely moved along a longitudinal direction of the substrate glass tube and the substrate glass tube is heated. By heating the substrate glass tube thus, the glass raw material gas put into the inside of the substrate glass tube is oxidized and the glass fine particles are generated. Then, the glass fine particles are deposited on an inner surface of the substrate glass tube in the downstream side of a stream of the glass raw material gas. Thereafter, the deposited glass fine particles are heated by traverses of the heating source and become transparent and a glass layer is sequentially formed.

Such a chemical vapor deposition step is repeatedly performed and until a wall thickness of the substrate glass tube reaches a desired thickness, a plurality of glass layers are formed and a glass tube forming an intermediate of the optical fiber preform can be formed.

Further, in a diameter shrinkage step, as a previous step of implementing collapse (wherein a glass pipe of which a hollow portion is filled in and becomes a glass rod) of a substrate glass tube by, for example, a collapse method or a rod-in collapse method, the substrate glass tube is heated along a longitudinal direction of the substrate glass tube and is softened and a diameter of the substrate glass tube is shrunk by surface tension similar to that of the collapse method.

[Non-Patent Reference 1]
"Optical Fiber Communications International Edition 1991", McGraw-Hill Book Co., p. 66-67

By the way, as a heating source used in such glass processing, an oxyhydrogen burner is generally used. When the oxyhydrogen burner is used, since its flame rises upwardly, normally, a substrate glass tube arranged in a horizontal direction is heated by applying the flame from the lower side thereof with being rotated about the axis thereof. In that case, the flame is not applied directly to the upper side of the substrate glass tube, so that it is difficult to obtain uniform temperature distribution over a circumferential direction of the substrate glass tube and circumferential bias occurs in viscosity of the substrate glass tube.

As a result of that, there were cases that a shape of the glass tube is deformed after the processing. Also, there were cases where the softened substrate glass tube is shrinked locally due to wind pressure caused by the flame.

When the glass tube is deformed by the processing thus and its sectional shape becomes oval, trouble about the optical fiber preform is caused.

For example, when collapse (wherein a glass pipe of which a hollow portion is filled in and becomes a glass rod) of a glass tube formed in an chemical vapor deposition step is implemented by a collapse method to form a glass rod and a core portion of the optical fiber preform is formed, a core of an optical fiber obtained from its preform also becomes oval. Then, transmission performances are degraded due to, for example, occurrence of polarization mode dispersion.

Incidentally, such ovality of the glass tube was enhanced remarkably when a diameter of the substrate glass tube is large and a thickness of the substrate glass tube is thin.

SUMMARY OF THE INVENTION

An object of the invention is to provide a glass processing method and apparatus capable of suppressing ovality of a glass tube in the case of performing processing such as chemical vapor deposition or diameter shrinkage by heating a substrate glass tube, and a glass tube processed thereby.

A glass processing method according to the invention capable of achieving the object is characterized in that in the case of performing chemical vapor deposition or diameter shrinkage of a substrate glass tube by relatively moving a heating furnace comprising a heating element for annularly enclosing the circumference of the substrate glass tube in a longitudinal direction of the substrate glass tube with respect to the substrate glass tube in which an outer diameter is 30 mm or more and a wall thickness is 3 mm or more and is less than 15 mm and an ovality of the outer diameter is 1.0% or less, a temperature of at least one of the heating element and the substrate glass tube is measured and the amount of heat generation of the heating element is adjusted based on the measured temperature.

Incidentally, an ovality of the outer diameter can be defined by the following formula (1) when the maximum value is a and the minimum value is b and the average value is c among outer diameters on one arbitrary circumference of a substrate glass tube.

$$\{(a-b)/c\} \times 100 \qquad (1)$$

Also, in the glass tube processing method according to the invention, the amount of heat generation is preferably adjusted at least one time along with the relative movement with respect to a region with 100 mm or longer of a longitudinal direction of the substrate glass tube.

Also, in the glass tube processing method according to the invention, a temperature of an external surface of the substrate glass tube is preferably measured through a void part provided in the heating element using a temperature measuring device provided outside the heating element.

Also, in the glass tube processing method according to the invention, in the case of performing the chemical vapor deposition or the diameter shrinkage, a distance along a longitudinal direction of the substrate glass tube from a place of the maximum temperature of the glass tube to a place in which a temperature lowers by 30° C. than the maximum temperature is preferably set at 20 mm or longer.

Also, in the glass tube processing method according to the invention, in the case of performing the chemical vapor deposition or the diameter shrinkage, a speed of the relative movement of the heating element is preferably set at 10 mm/min or higher.

Also, in the glass tube processing method according to the invention, in the case of performing the chemical vapor deposition or the diameter shrinkage, a difference between the maximum temperature and the minimum temperature in a circumferential direction of the substrate glass tube is preferably set at 200° C. or lower.

Also, in the glass tube processing method according to the invention, in the case of performing the chemical vapor deposition or the diameter shrinkage, the substrate glass tube is preferably rotated about the center axis of the substrate glass tube at speeds of 10 rpm or higher and 150 rpm or lower.

Also, in the glass tube processing method according to the invention, in the case of performing the chemical vapor deposition or the diameter shrinkage, with respect to a region with 100 mm or longer of a longitudinal direction of the substrate glass tube, an outer diameter of the substrate glass tube is measured along with the relative movement and a pressure of the inside of the substrate glass tube is preferably adjusted at least one time based on the measured outer diameter.

Also, in the glass tube processing method according to the invention, the outer diameter is preferably measured using an outer diameter measuring device selected from the group of a laser light type monitor, a CCD camera and an X-ray camera.

Also, in the glass tube processing method according to the invention, the outer diameter is preferably measured through a void part provided in the heating element using an outer diameter measuring device provided outside the heating element.

Also, in the glass tube processing method according to the invention, in the case of performing the chemical vapor deposition or the diameter shrinkage, a pressure difference between the inside and the outside of the substrate glass tube is preferably adjusted at 1500 Pa or lower.

Also, in the glass tube processing method according to the invention, a ratio ID/Od between an outer diameter Od of the substrate glass tube and an inside diameter ID of the heating element is preferably set in the range of 1.1 to 5.0.

Also, a glass tube according to the invention is characterized in that the glass tube is processed using a glass tube processing method of the invention and an ovality of an outer diameter is 0.5% or less.

Also, a glass tube processing apparatus according to the invention is characterized by comprising a heating furnace comprising a heating element for annularly enclosing the circumference of a substrate glass tube which is a heated object, a gas supply part for supplying gas to the inside of the substrate glass tube, a gas exhaust part for exhausting gas from the inside of the substrate glass tube, movement means for relatively moving the substrate glass tube and the heating furnace in a longitudinal direction of the substrate glass tube, a temperature measuring device for measuring a temperature of at least one of the heating element and the substrate glass tube, and heat generation amount adjusting means for adjusting the amount of heat generation of the heating element.

Also, in the glass tube processing apparatus according to the invention, the glass tube processing apparatus preferably comprises an outer diameter measuring device for measuring an outer diameter of the substrate glass tube, and pressure adjusting means for adjusting a pressure of the inside of the substrate glass tube.

Also, in the glass tube processing apparatus according to the invention, the heating element preferably has a void part passing through the inner circumference side and the outer circumference side of the heating element.

Also, in the glass tube processing apparatus according to the invention, the void part is a hole and a plurality of holes are formed and are preferably arranged so as not to align in any of a circumferential direction or a longitudinal direction of the heating element.

Also, in the glass tube processing apparatus according to the invention, the heating furnace is an induction furnace comprising an induction coil in the circumference of the heating element, and the void part is a hole, and an opening area of the inner circumference side per one hole of the hole arranged inside the induction coil is 1000 mm$^2$ or less, and the total opening area of the inner circumference side of the hole arranged inside the induction coil is preferably 50% or less an area of the inner circumference side of the heating element located inside the induction coil.

DETAILED DESCRIPTION OF THE PREFERRED EMBODIMENTS

Examples of embodiments of a glass tube processing method, a glass tube processing apparatus and a glass tube according to the invention will be described below with reference to the drawings.

Figure 1:
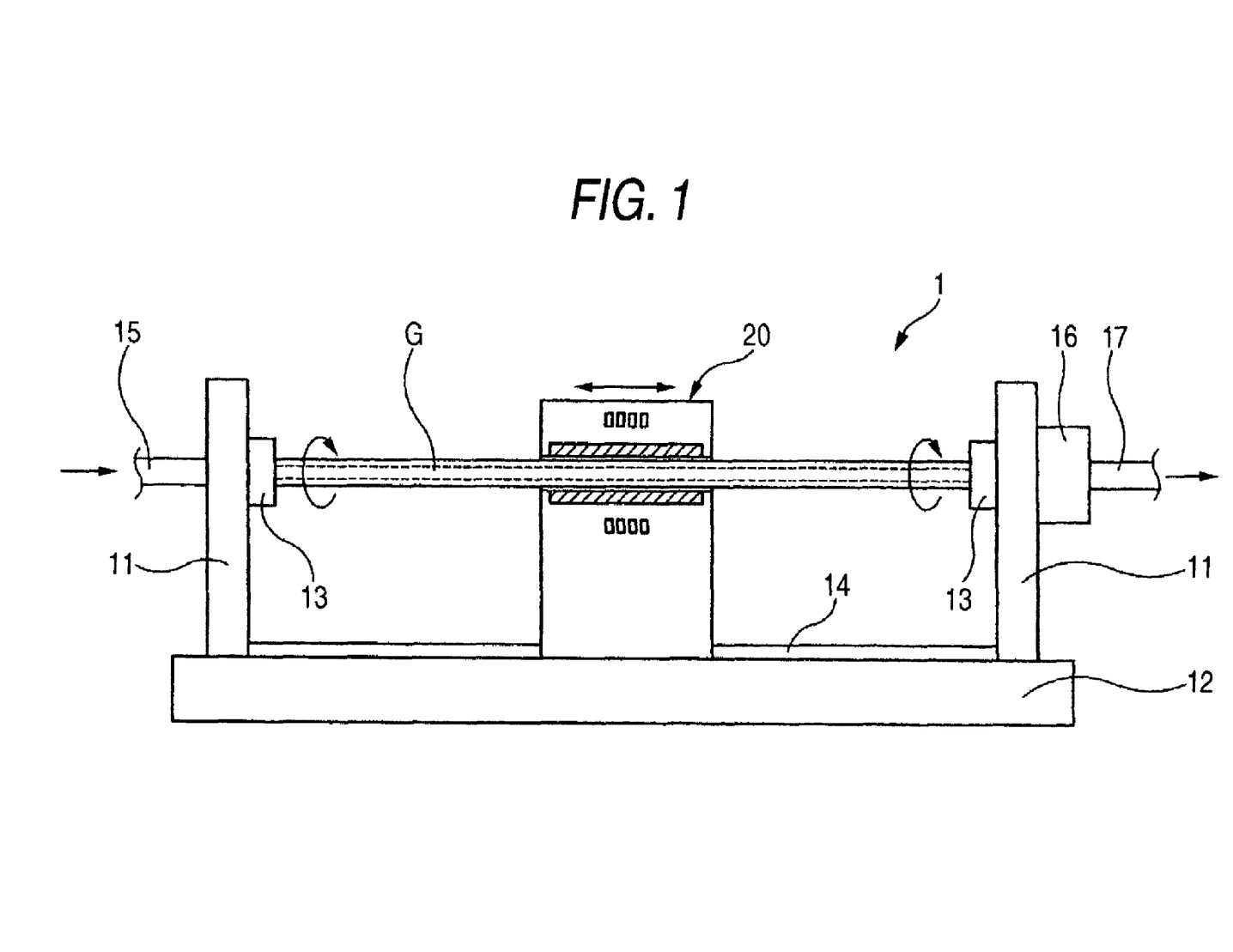
FIG. 1 is the whole schematic view of a glass tube processing apparatus capable of implementing a glass tube processing method according to the invention.

A glass tube processing apparatus capable of implementing a glass tube processing method according to the invention is shown in FIG. 1.

A glass tube processing apparatus 1 shown in FIG. 1 is means for generating glass fine particles inside a substrate glass tube by the so-called chemical vapor deposition method (chemical vapor deposition CVD method) and depositing the glass fine particles inside the substrate glass tube and forming a glass film.

The glass tube processing apparatus 1 has a pedestal 12 on which support parts 11 are stood in the vicinity of both ends. The support parts 11 respectively have rotatable chucks 13 and these chucks 13 respectively grasp the ends of a substrate glass tube G and the substrate glass tube G is supported horizontally.

A heating furnace 20 for heating the substrate glass tube G is provided between the two support parts 11. A heating furnace comprising a heating element for annularly enclosing the substrate glass tube G can be used as this heating furnace 20 and, for example, an induction furnace or a resistance heating furnace can be used. In the present embodiment, the case of using the induction furnace will be described.

The heating furnace 20 is mounted with respect to a support rail (movement means) 14 provided between the support parts 11 on the pedestal 12, and can be moved along a longitudinal direction of the support rail 14. The support rail 14 is arranged in parallel with the center axis of the substrate glass tube G grasped by the chucks 13, and the heating furnace 20 moves in parallel with the center axis of the substrate glass tube G.

Also, a gas supply tube (gas supply part) 15 is connected to one side (left side in the drawing) of the support parts 11, and a buffer tank 16 and a gas exhaust tube (gas exhaust part) 17 are connected to the other side (right side in the drawing) of the support parts 11. These gas supply tube 15, buffer tank 16 and gas exhaust tube 17 form a flow path of gas continuous with space of the inside of the substrate glass tube G.

Also, gas introduction means (not shown) for introducing gas into space of the inside of the substrate glass tube G is connected to the gas supply tube 15. The gas introduction means is constructed so that silicon tetrachloride ($SiCl_4$), oxygen ($O_2$), helium (He), germanium tetrachloride ($GeCl_4$), etc. can be introduced as single gas or properly mixed gas.

Figure 2:
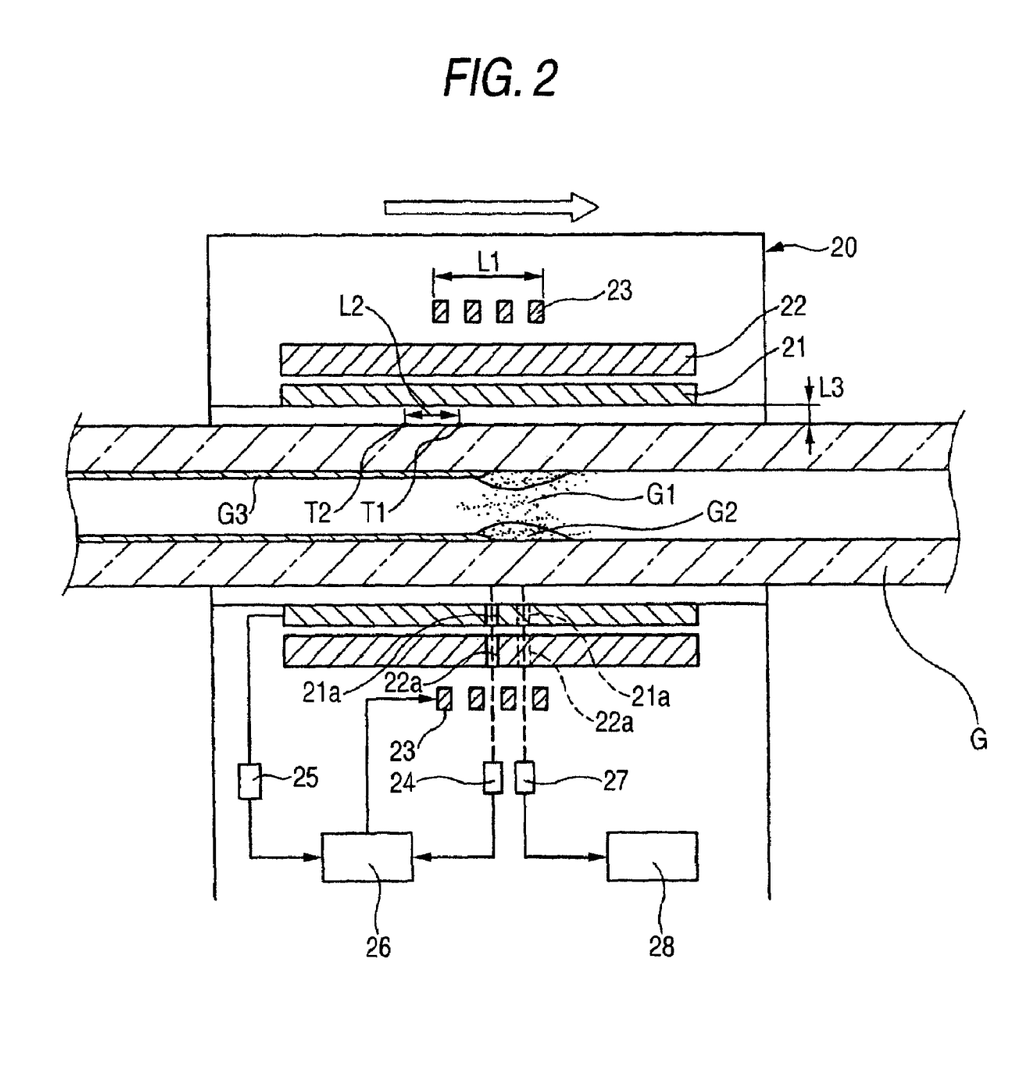
FIG. 2 is a schematic view showing a heating furnace shown in FIG. 1.

The heating furnace 20 shown in FIG. 1 will be described. As shown in FIG. 2, the heating furnace 20 of the embodiment is a furnace of a high frequency induction heating method, and a heating element 21 generates heat by passing an AC current through an induction coil 23. The heating element 21 has a cylindrical shape annularly enclosing the circumference of the substrate glass tube G, and the material is graphite or zircon. This heating element 21 generates heat to a temperature higher than or equal to a softening point of glass to heat and soften the substrate glass tube G. Incidentally, a softening point is about 1700° C., when material of the substrate glass tube G is glass with high purity formed by a VAD method etc.

The induction coil 23 is arranged so as to heat an axial center portion of the heating element 21, and the number of turns of the induction coil is set properly.

Also, an insulator 22 is provided between the heating element 21 and the induction coil 23.

Also, the heating furnace 20 includes a temperature measuring device 25 for measuring a temperature of the heating element 21 and a temperature measuring device 24 for measuring a temperature of the substrate glass tube G. The temperature measuring device 25 may be either a contact type or a noncontact type, and the temperature measuring device 24 is a radiation thermometer of a noncontact type. A temperature of a region heated by the heating element 21 in the substrate glass tube G is measured by the temperature measuring device 24, and preferably, a temperature of an external surface of a portion located inside the induction coil 23 can be measured. For that purpose, void parts passing through the inner circumference side and outer circumference side are formed as holes 21a, 22a respectively in the insulator 22 and the heating element 21 arranged inside the induction coil 23.

By such a configuration, a temperature of an external surface of a heated region of the substrate glass tube G can be directly measured by the temperature measuring device 24 arranged outside the induction coil 23 through the holes 21a, 22a.

Also, the temperature measuring devices 24, 25 are connected to a current control part 26 and can send respective measured values to the current control part 26. The current control part 26 is means for adjusting magnitude of current passed through the induction coil 23 based on temperatures measured by the temperature measuring devices 24, 25. The amount of heat generation of the heating element 21 can be adjusted by adjusting the magnitude of current passed through the induction coil 23. That is, the current control part 26 functions as heat generation amount adjusting means of the heating element 21. Also, the amount of heat generation may be adjusted by adjusting magnitude of voltage applied to the induction coil 23.

Also, a plurality of temperature measuring devices 24 for measuring a temperature of the substrate glass tube G may be provided in order to measure temperatures of plural places of the substrate glass tube G.

Incidentally, in the invention, a temperature of at least any one of the heating element 21 and the substrate glass tube G could be measured.

Also, the heating furnace 20 comprises an outer diameter measuring device 27 capable of measuring an outer diameter of the substrate glass tube G. Any of a laser light type monitor, a CCD camera and an X-ray camera could be used as the outer diameter measuring device 27. Also, the outer diameter measuring device 27 can preferably measure an outer diameter of a place immediately after being heated or a place heated in the substrate glass tube G. In the embodiment, the outer diameter measuring device 27 is arranged outside the induction coil 23, and an outer diameter of a place heated can be measured through the holes 21a, 22a of the insulator 22 and the heating element 21 separately formed for temperature measurement described above. Also, the outer diameter measuring device 27 is connected to a flow rate control part 28 and can send a measured value to the flow rate control part 28. The flow rate control part 28 is means for adjusting a pressure of the inside of the substrate glass tube G based on an outer diameter value measured by the outer diameter measuring device 27.

Next, a configuration for adjusting a pressure of the inside of the substrate glass tube G will be described with reference to a schematic view shown in FIG. 3.

Figure 3:
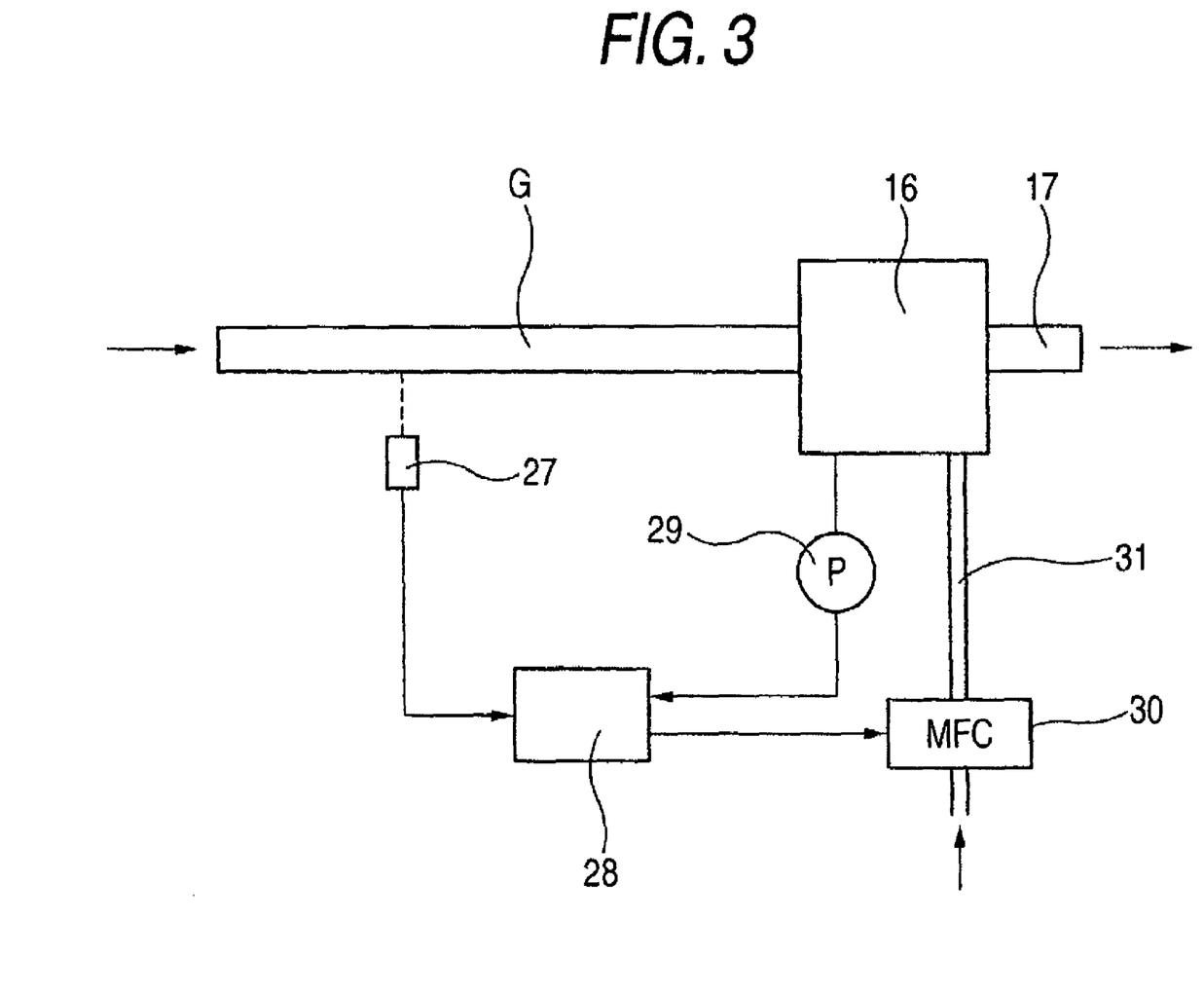
FIG. 3 is a schematic view showing a configuration for controlling a pressure of the inside of a substrate glass tube.

As shown in FIG. 3, gas is supplied from one end side (left side in the drawing) of the inside of the substrate glass tube G and the gas is exhausted from the other end side (right side in the drawing). The buffer tank 16 is provided between the substrate glass tube G and the gas exhaust tube 17 for exhausting the gas, and the gas is stagnated in this buffer tank 16 before exhausting. A gas tube 31 is connected to the buffer tank 16, and gas of a flow rate adjusted by a flow rate adjusting device (MFC) 30 is supplied to the inside of the buffer tank 16 properly. Depending on the amount of gas supplied from the gas tube 31, a pressure of the inside of the buffer tank 16 changes and accordingly, a pressure of the inside of the substrate glass tube G also changes.

Also, a pressure gauge 29 for measuring a pressure of the inside of the buffer tank 16 is mounted in the buffer tank 16. Also, the pressure gauge 29 is connected to the flow rate control part 28 and a measured value is sent to this flow rate control part 28.

By such a configuration, based on an outer diameter value measured by the outer diameter measuring device 27 and a pressure value of the inside of the buffer tank 16 measured by the pressure gauge 29, the flow rate control part 28 controls the flow rate adjusting device 30 to adjust a pressure of the inside of the buffer tank 16. By adjusting the pressure of the inside of the buffer tank 16, a pressure of the inside of the substrate glass tube G is adjusted and an outer diameter of the substrate glass tube G softened can be adjusted.

Also, by reason of the fact that the holes 21a are formed in the heating element 21, there is a possibility that the temperature of a region where the substrate glass tube G facing the holes 21a becomes lower as compared with that of the circumference. Therefore, as shown in FIG. 2, a plurality of holes 21a formed in the heating element 21 are preferably arranged so as not to align in any of the same circumferential direction or the same longitudinal direction in the heating element 21.

Further, by setting an opening area of the inner circumference side per one hole of the holes 21a arranged inside the induction coil 23 at 1000 $mm^2$ or less, an influence on heating by reason of the fact that the holes 21a are formed can be reduced to maintain a uniform heating condition. Also, in order to maintain high heating efficiency by the heating element 21, it is desirable to reduce the total opening area of the inner circumference sides of all the holes 21a arranged inside the induction coil 23. For example, the total opening area of the inner circumference sides of the holes 21a with respect to an area of the inner circumference side of the heating element 21 located inside the induction coil 23 could be set at 50% or less.

Also, the heating element 21 described above has a cylindrical shape in which the holes 21a are formed as a void part, but a shape of the heat generation body may be other forms as long as the circumference of the substrate glass tube is annularly enclosed.

Figure 4:
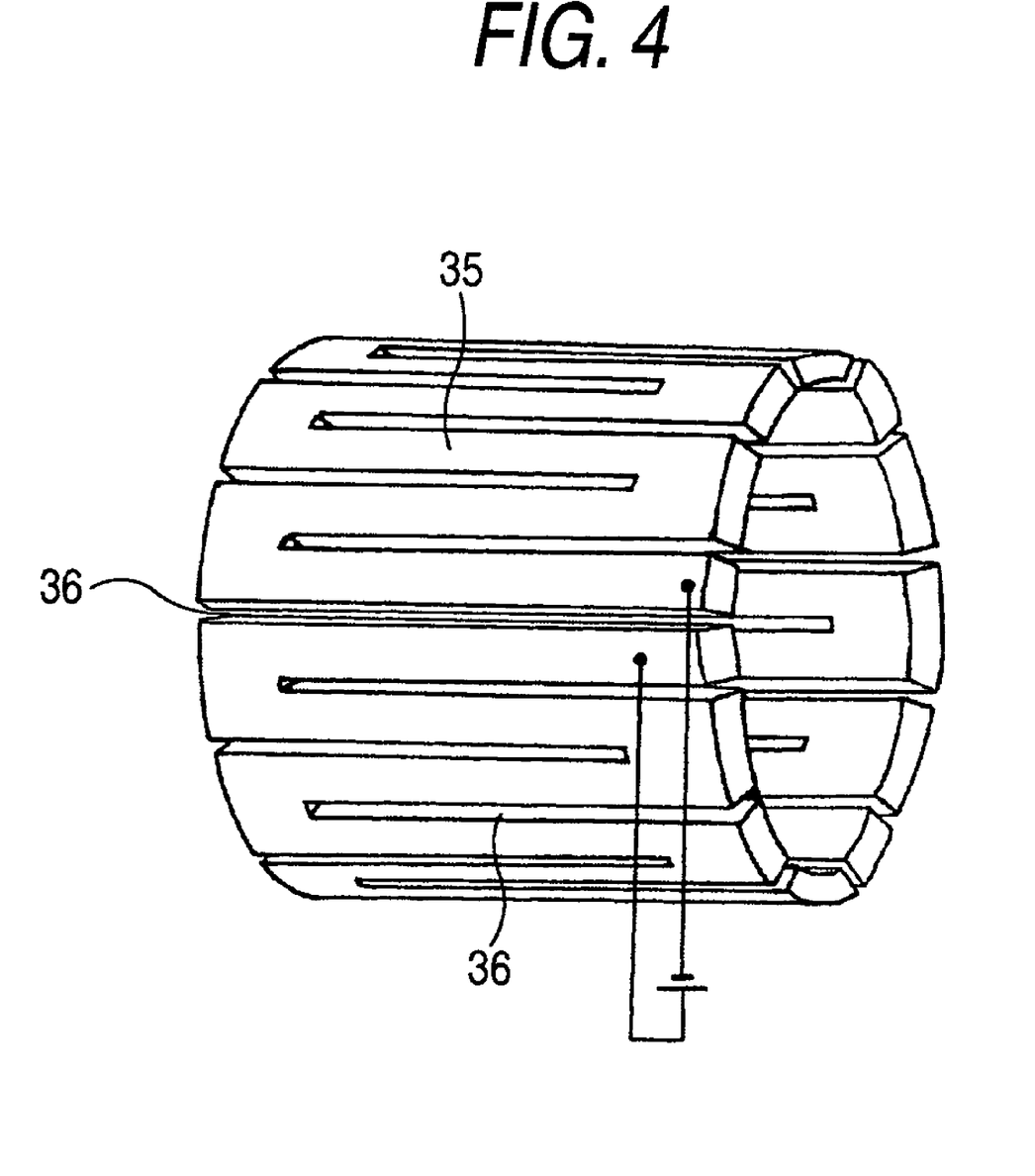
FIG. 4 is a perspective view showing an example of another heating element.

For example, as another heating element, it may be a form with a cylindrical shape as a whole in a state of meandering in a longitudinal direction (right and left directions in the drawing) of the substrate glass tube G as shown in FIG. 4. In this form, a meandering gap is a slit-shaped void part 36 which is formed along the longitudinal direction of the substrate glass tube G and passes through the inner circumference side and the outer circumference side of the heating element. Then, an outer diameter or a temperature of the substrate glass tube G can be measured through this void part 36.

Also, as shown in FIG. 4, electrodes are connected to both sides of places discontinuous in a circumferential direction and heat of a heating element 35 can be generated by an electric resistance method. In that case, the induction coil as shown in FIG. 2 is not required.

Also, as another heating element, it may be a heating element in which it is divided into two or more cylindrical shapes and its gap is formed as a void part.

Incidentally, in the invention, in order to measure a temperature or an outer diameter of the substrate glass tube from the radial outside of the heating element, a void part is not necessarily formed as a physical space. For example, any material through which sensor light (infrared rays, etc.) of the temperature measuring device or the outer diameter measuring device can pass may be provided.

Next, a method for performing chemical vapor deposition in a substrate glass tube G using the glass tube processing apparatus 1 shown in FIGS. 1 to 3 will be described.

Incidentally, in a substrate glass tube G used in the invention, an outer diameter is 30 mm or more and a wall thickness is 3 mm or more and is less than 15 mm and an ovality of the outer diameter is 1.0% or less. Preferably, an inner diameter could be 24 mm or more. In the case of using such a substrate glass tube with a large diameter and a thin thickness, an oval suppression effect of the invention can be obtained remarkably.

Also, as a length of the substrate glass tube G, a substrate glass tube with a length of, for example, about 600 mm can be used preferably.

Further, a ratio ID/Od between an outer diameter Od of the substrate glass tube and an inside diameter ID of the heating element is preferably set in the range of 1.1 to 5.0 by properly setting an outer diameter of the substrate glass tube G used. By such setting, a gap L3 between the heating element 21 and the substrate glass tube G becomes narrow and the substrate glass tube G can be heated efficiently and circularity of a glass tube obtained by processing can be advanced. Also, space between the heating element 21 and the substrate glass tube G becomes small and variations in external pressure applied to the substrate glass tube G can be decreased.

In the case of performing chemical vapor deposition, glass raw material gas including silicon tetrachloride and oxygen is first introduced into the inside of a substrate glass tube G by gas introduction means. In order to adjust a partial pressure of the silicon tetrachloride in the glass raw material gas, helium may be included in the glass raw material gas. Also, the partial pressure of the silicon tetrachloride can be adjusted by the amount of oxygen.

The substrate glass tube G is rotated about the center axis of the substrate glass tube while the gas is properly introduced into the inside of the substrate glass tube G thus. A rotational speed is set at, for example, 10 rpm or higher and 150 rpm or lower. By setting the rotational speed at 10 rpm or higher, a difference between temperatures of a circumferential direction of the substrate glass tube G can be decreased. For example, a difference between the maximum temperature and the minimum temperature of a circumferential direction in a heated region is easily set at 200° C. or lower. As a result of this, a difference between viscosities of the circumferential direction of the substrate glass tube G can be decreased to prevent ovality. Further, preferably, a difference between the maximum temperature and the minimum temperature of the circumferential direction in the heated region could be set at 50° C. or lower.

Also, by setting the rotational speed at 150 rpm or lower, occurrence of whirling of the substrate glass tube due to excessive centrifugal force can be suppressed.

Next, the heating element 21 generates heat by passing a current through the induction coil 23 so that a surface temperature of the outside of the substrate glass tube G reaches a desired temperature in the range of, for example, about 1900° C. to 2100° C.

Then, the heating furnace 20 is transversely moved from one end side of the substrate glass tube G toward the other end side (that is, along a longitudinal direction). At this time, a start position of the traverse is set at the side of the gas supply tube 15 to which glass raw material gas is supplied. Incidentally, a traverse speed is set at 10 mm/min or higher. By setting such a traverse speed, as shown in FIG. 2, a distance L2 from a place T1 in which the maximum temperature of the substrate glass tube G is reached to a place T2 in which a temperature lowers by 30° C. than the maximum temperature can be increased, and a rate of change in viscosity in the longitudinal direction of the substrate glass tube G can be decreased. Therefore, variations in an outer diameter in the longitudinal direction of the substrate glass tube G can be suppressed.

Also, the distance L2 varies depending on a distance L1 at which the induction coil 23 is provided, so that the distance L2 is easily increased by increasing the distance L1 of the induction coil 23 previously. Incidentally, the distance L2 could be, for example, 20 mm or longer.

Further, in the embodiment, a temperature of an external surface of the heated substrate glass tube G is measured through the holes 21a, 22a by the temperature measuring device 24, a current of the induction coil 23 is controlled by the current control part 26, and the amount of heat generation of the heating element 21 is adjusted so that the measured value becomes a desired value. As a result of this, a temperature of the substrate glass tube G is controlled so as to become constant in a longitudinal direction and a shape of the substrate glass tube G can be made uniform in the longitudinal direction.

Besides, a relation between a temperature of the heating element 21 and a temperature of the substrate glass tube G is previously examined and the amount of heat generation of the heating element 21 may be adjusted so that the temperature of the substrate glass tube G becomes a desired value based on the temperature of the heating element 21 measured by the temperature measuring device 24.

Also, when the amount of heat generation of the heating element 21 is adjusted with using both of measured values of a temperature of the heating element 21 and a temperature of the substrate glass tube G, the temperature of the substrate glass tube G can be controlled with higher accuracy.

Incidentally, the amount of heat generation of this heating element 21 could be adjusted continuously with respect to a region with 100 mm or longer of a longitudinal direction of the substrate glass tube G during at least one traverse.

Also, an outer diameter of the substrate glass tube G heated is measured through the holes 21a, 22a by the outer diameter measuring device 27 and based on an outer diameter value measured by the outer diameter measuring device 27 and a pressure value of the inside of the buffer tank 16 measured by the pressure gauge 29, the flow rate adjusting device 30 is controlled by the flow rate control part 28 so that the measured value becomes a desired value. As a result of this, a pressure of the inside of the substrate glass tube G is adjusted along with a pressure of the inside of the buffer tank 16 and an outer diameter of the substrate glass tube G softened is adjusted and can be maintained at a desired value. Therefore, a shape of the substrate glass tube G can be made uniform in the longitudinal direction.

Also, in the case of adjusting a pressure, a pressure difference between the inside and the outside of the substrate glass tube G could be adjusted so as to be at 1500 Pa or lower. By maintaining the pressure difference between the inside and the outside of the substrate glass tube G at 1500 Pa or lower, sudden deformation of the substrate glass tube G can be prevented to suppress ovality.

Incidentally, this pressure could be adjusted continuously with respect to a region with 100 mm or longer of a longitudinal direction of the substrate glass tube G during at least one traverse.

As shown in FIG. 2, when the heating furnace 20 is transversely moved in a longitudinal direction of the substrate glass tube G with glass raw material gas introduced, silicon tetrachloride is oxidized in the inside of the substrate glass tube G in a heated region, and glass fine particles (called soot) G1 which are silica ($SiO_2$) are generated. Then, by thermophoresis, the glass fine particles G1 are deposited on the inside of the substrate glass tube in the downstream side of a stream of the glass raw material gas (called sooting). Then, a porous glass fine particle deposit G2 is formed in a portion in which the glass fine particles G1 are deposited and also, the deposit is heated by traverses of the heating furnace 20 and becomes transparent and a glass layer G3 is sequentially formed.

After the glass layer G3 is deposited and the heating furnace 20 is transversely moved to the other end side (the side of the gas exhaust tube 17) of the substrate glass tube G, a temperature of the heating furnace 20 is decreased to a temperature at which the glass fine particles G1 are not generated in the substrate glass tube G (for example, a temperature at which a surface temperature of the substrate glass tube G becomes about 500° C.). Then, the heating furnace 20 whose temperature is decreased is returned by transversely moving the heating furnace 20 to the side of the gas supply tube 15 in which the sooting is started.

Further, reciprocating movement by the traverse described above is repeated plural times and the glass layer G3 with a desired thickness is formed. As a result of this, a desired glass tube forming an intermediate of an optical fiber preform can be formed. Incidentally, the glass layer G3 with an adjusted refractive index can be formed by including gas such as germanium tetrachloride for refractive index adjustment in gas supplied to the inside of the substrate glass tube G.

Also, in the glass tube processing method according to the invention, diameter shrinkage of a substrate glass tube can also be performed by performing control similar to that of the chemical vapor deposition of the substrate glass tube described above.

Figure 5:
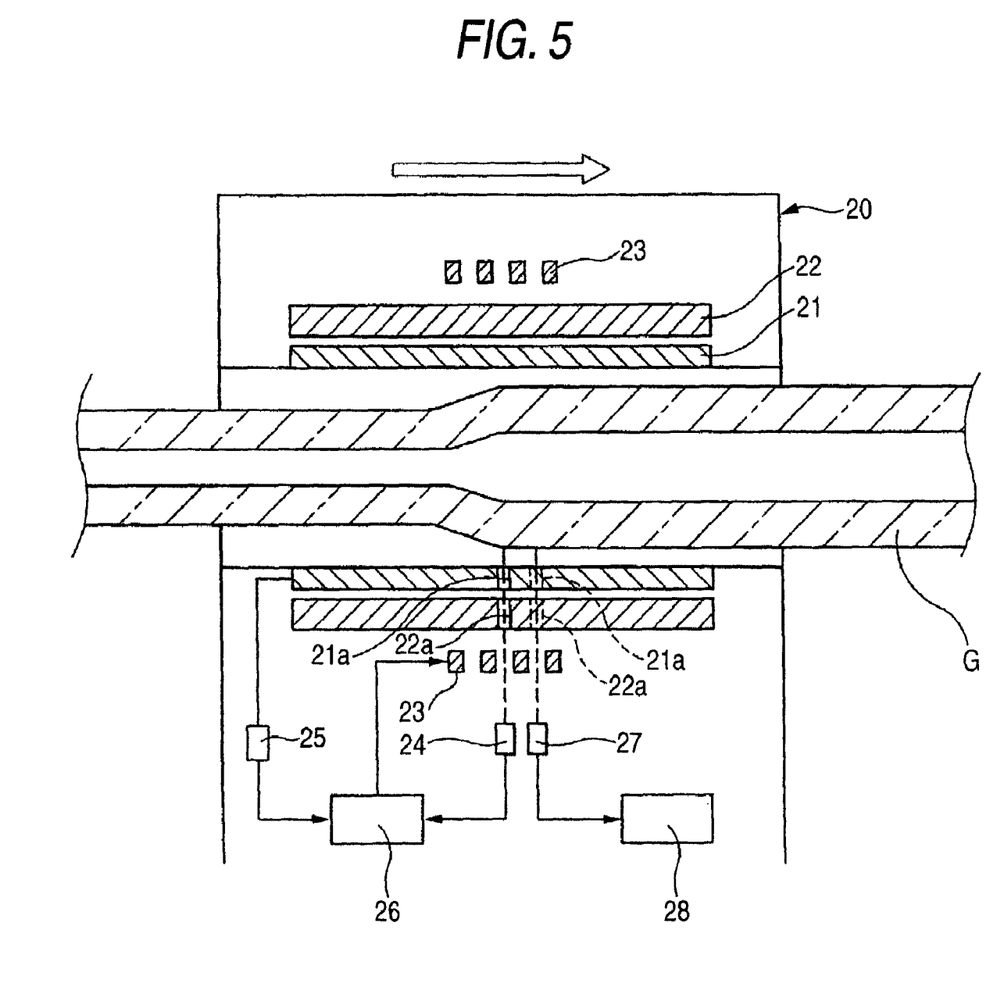
FIG. 5 is a schematic view of the case of performing diameter shrinkage in the glass tube processing/method according to the invention.

As shown in FIG. 5, in the case of performing diameter shrinkage of a substrate glass tube G, a glass tube with a small oval rate can be obtained by performing the diameter shrinkage while performing similar temperature control or pressure control using the glass tube processing apparatus 1 (see FIGS. 1 to 3). Incidentally, inert gas such as nitrogen or argon could be used as gas supplied to the inside of the substrate glass tube G. Also, the diameter shrinkage can be performed easily by setting a pressure of the inside of the substrate glass tube G at a negative pressure with respect to the outside of the substrate glass tube G, and the oval rate can be reduced further by setting the pressure of the inside of the substrate glass tube G at a positive pressure somewhat with respect to the outside of the substrate glass tube G.

According to the glass tube processing method and the glass tube processing apparatus described above, ovality of a glass tube obtained can be suppressed effectively to obtain the glass tube in which an ovality of an outer diameter is 0.5% or less.

EXAMPLE

Next, an example according to the invention will be described.

Chemical vapor deposition with a substrate glass tube G was performed while performing the temperature control or pressure control described above using the glass tube processing apparatus 1 described above. A substrate glass tube in which an outer diameter was 35 mm and an inside diameter was 27 mm and an ovality was 0.3% was used as the substrate glass tube G. Also, a traverse speed of the heating furnace 20 at the time of the chemical vapor deposition was 100 mm/min and a rotational speed of the substrate glass tube G was set at 40 rpm. Also, a pressure of the inside of the substrate glass tube G at the time of the chemical vapor deposition was set at a pressure which was high by 80 Pa with respect to an atmospheric pressure of the outside. Further, the maximum temperature of an external surface of the substrate glass tube G heated was 2100° C.

Further, for comparison with a result of the present example, chemical vapor deposition with the substrate glass tube G was similarly performed using an oxyhydrogen burner as a heating source.

Then, outer diameters of respective glass tubes obtained in the case of using the oxyhydrogen burner and the case of using the heating furnace 20 as the heating source were measured along a circumferential direction of any longitudinal places. A graph of this result is shown in FIG. 6.

Figure 6:
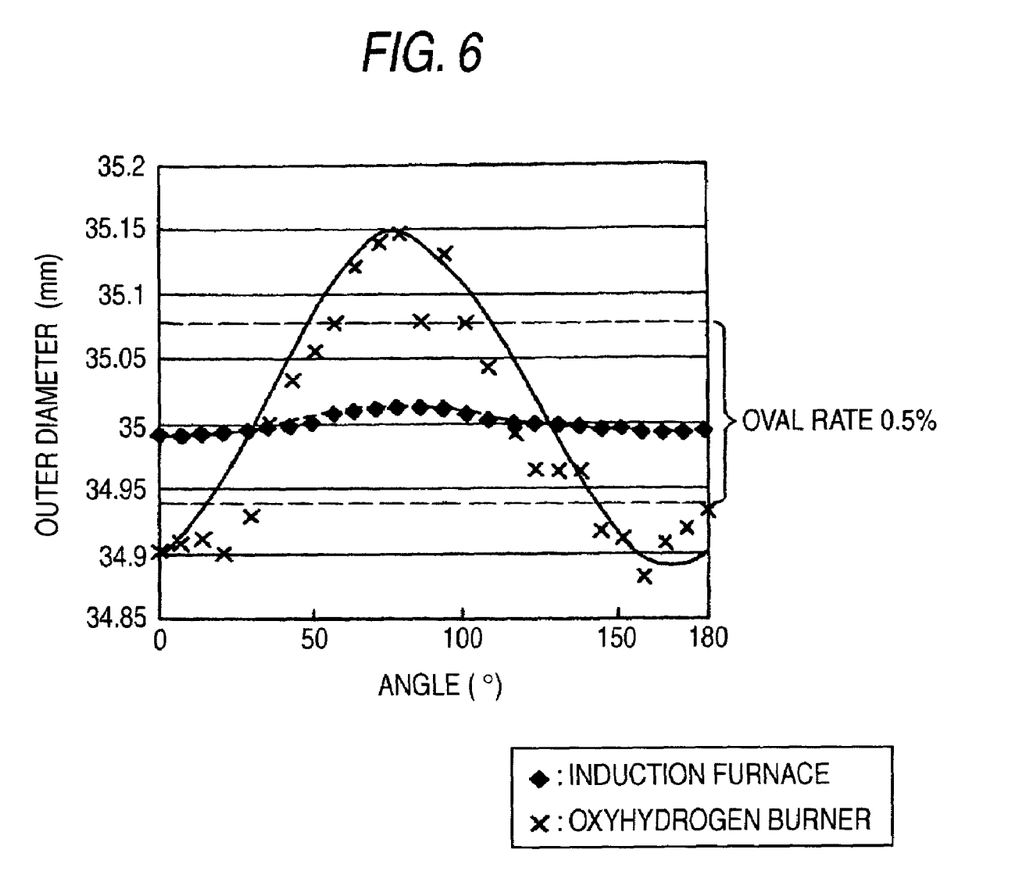
FIG. 6 is a graph showing a result of an example.

As shown in FIG. 6, in the example according to the invention in which the chemical vapor deposition was performed using the heating furnace 20, variations in the outer diameter were small and an ovality was about 0.2%. On the contrary, in a comparative example in which the chemical vapor deposition was performed using the oxyhydrogen burner, variations in the outer diameter were large and an ovality became larger than 0.5%.

In accordance with the glass tube processing method and the glass tube processing apparatus according to the invention thus, it was recognized that a glass tube with a small oval rate of the outer diameter could be obtained.

According to the invention, a glass processing method and apparatus capable of suppressing ovality of a glass tube in the case of performing processing such as chemical vapor deposition or diameter shrinkage by heating a substrate glass tube and a glass tube processed thereby can be provided.

What is claims is:

1. A glass tube processing method for performing chemical vapor deposition or diameter shrinkage of a substrate glass tube comprising the steps of:

relatively moving a heating furnace which is an induction furnace including a heating element annularly enclosing the circumference of the substrate glass tube and an induction coil in the circumference of the heating element in a longitudinal direction of the substrate glass tube, the substrate glass tube having an outer diameter of 30 mm or more, a wall thickness of 3 mm to 15 mm, and an ovality of the outer diameter of 1.0% or less, wherein a ratio ID/Od between the outer diameter Od of the substrate glass tube and an inside diameter ID of the heating element is in the range of 1.1 to 5.0, and a speed of the relative movement of the heating furnace is at 10 mm/min or higher, measuring a temperature of an external surface of the substrate glass tube through a void part provided at a part of the heating element, the part being inside of the induction coil using a temperature measuring device provided outside the heating element, and adjusting the amount of heat generation of the heating element based on the measured temperature such that a distance along a longitudinal direction of the substrate glass tube from a place of the maximum temperature of the glass tube to a place in which a temperature lowers by 30° C. than the maximum temperature is at 20 mm or longer and a difference between the maximum temperature and the minimum temperature in a circumferential direction of the substrate glass tube is at 200° C. or lower, wherein the void part is a plurality of holes which are formed and arranged not to align in any of the same circumferential direction or the same longitudinal direction of the heating element, an opening area of the inner circumference side per one hole of the holes is 1000 $mm^2$ or less, and the total opening area of the inner circumference side of the holes is 50% or less an area of the inner circumference side of the heating element located inside the induction coil.

2. The glass tube processing method as claimed in claim 1, further comprising:

adjusting the amount of heat generation for a region that is 100 mm or longer in a longitudinal direction of the substrate glass tube, while the heating furnace moves relative to the substrate tube.

3. The glass tube processing method as in claim 1, wherein in the case of performing the chemical vapor deposition or the diameter shrinkage, the substrate glass tube is rotated about the center axis of the substrate glass tube at speeds of 10 rpm to 150 rpm.

4. The glass tube processing method as in claim 1, further comprising:

measuring an outer diameter of the substrate glass tube for a region that is 100 mm or longer of a longitudinal direction of the substrate glass tube through a void part provided in the heating element using an outer diameter measuring device provided outside the heating element while the heating furnace moves relative to the substrate tube, and adjusting a pressure of the inside of the substrate glass tube based on the measured outer diameter.

5. The glass tube processing method as claimed in claim 4, wherein the outer diameter is measured using an outer diameter measuring device selected from the group of a laser light type monitor, a CCD camera and an X-ray camera.

6. The glass tube processing method as in claim 1, wherein in the case of performing the chemical vapor deposition or the diameter shrinkage, a pressure difference between the inside and the outside of the substrate glass tube is adjusted to a value of 1500 Pa or lower.

7. The glass tube processing method as claimed in claim 1, wherein in the case of performing the chemical vapor deposition, a pressure difference between the inside and the outside of the substrate glass tube is adjusted to a value of 1500 Pa or lower.

* * * * *

UNITED STATES PATENT AND TRADEMARK OFFICE
CERTIFICATE OF CORRECTION

PATENT NO.       : 7,637,125 B2                                     Page 1 of 1
APPLICATION NO.  : 10/992102
DATED            : December 29, 2009
INVENTOR(S)      : Nakanishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1250 days.

Signed and Sealed this

Ninth Day of November, 2010

David J. Kappos
*Director of the United States Patent and Trademark Office*